(12) United States Patent
Hill

(10) Patent No.: US 11,629,786 B2
(45) Date of Patent: Apr. 18, 2023

(54) STEPPER DRIVEN VALVE FOR CONTROLLING FLUID COMMUNICATION BETWEEN A FUEL TANK AND A CANISTER

(71) Applicant: Plastic Omnium Advanced Innovation and Research, Brussels (BE)

(72) Inventor: David Hill, Commerce Township, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/637,061

(22) PCT Filed: Aug. 7, 2018

(86) PCT No.: PCT/EP2018/071433
§ 371 (c)(1),
(2) Date: Feb. 6, 2020

(87) PCT Pub. No.: WO2019/030243
PCT Pub. Date: Feb. 14, 2019

(65) Prior Publication Data
US 2020/0240368 A1 Jul. 30, 2020

Related U.S. Application Data

(60) Provisional application No. 62/542,029, filed on Aug. 7, 2017.

(51) Int. Cl.
*F16K 1/44* (2006.01)
*B60K 15/035* (2006.01)
*F02M 25/08* (2006.01)

(52) U.S. Cl.
CPC ........ *F16K 1/443* (2013.01); *B60K 15/03519* (2013.01); *F02M 25/0836* (2013.01);
(Continued)

(58) Field of Classification Search
CPC ........ B60K 15/03519; B60K 15/03504; B60K 2015/03514; F16K 1/54; F16K 1/385; F16K 31/04; F16K 1/443; F02M 25/0836
See application file for complete search history.

(56) References Cited

U.S. PATENT DOCUMENTS 2,114,789 A * 4/1938 Urquhart ............... F16K 5/0278
251/333
5,419,531 A 5/1995 Hoehn
(Continued)

FOREIGN PATENT DOCUMENTS

BE 368391 4/1930
CN 101493148 A 7/2009
(Continued)

OTHER PUBLICATIONS

International Search Report dated Nov. 16, 2018 in PCT/EP2018/071433 filed Aug. 7, 2018.
(Continued)

*Primary Examiner* — Atif H Chaudry
(74) *Attorney, Agent, or Firm* — Oblon, McClelland, Maier & Neustadt, L.L.P.

(57) ABSTRACT

A fuel system having a fuel tank, a filler pipe for adding liquid fuel, a carbon canister for collecting fuel vapors from the fuel tank during a refueling operation, a stepper motor and a stepper driven valve for controlling fluid communication between the fuel tank and the canister, where the valve is configured to be positionable in a closed position, an open position creating a passageway with a first size, and one or more intermediate positions each creating a passageway with a size which is smaller than the first size and having a moving element, movable relative to a valve opening between a closed position and an opened position, the moving element having: a sealing means for making a leak tight seal and, a deflecting means for controlling the (Continued)

fluid flow, where the deflecting means protrudes inside the valve opening and is adapted to be located upstream relative to sealing means.

10 Claims, 3 Drawing Sheets

(52) U.S. Cl.
CPC .......... *B60K 15/03504* (2013.01); *B60K 2015/03514* (2013.01)

(56) References Cited

U.S. PATENT DOCUMENTS

| | | | | |
|---|---|---|---|---|
| 5,970,996 | A * | 10/1999 | Markey | .............. D03D 47/3053 137/1 |
| 6,460,567 | B1 | 10/2002 | Hansen, III et al. | |
| 6,568,656 | B1 | 5/2003 | Wrocklage | |
| 2002/0088957 | A1 | 7/2002 | Weldon et al. | |
| 2008/0001110 | A1 | 1/2008 | Nagai | |
| 2011/0168931 | A1 | 7/2011 | Sugiura et al. | |
| 2012/0211687 | A1 * | 8/2012 | Benjey | .................... F16K 31/53 251/248 |
| 2014/0130917 | A1 | 5/2014 | Lively et al. | |
| 2015/0330338 | A1 * | 11/2015 | Ito | ........................ F02M 25/089 123/520 |
| 2016/0076493 | A1 | 3/2016 | Koller et al. | |
| 2017/0002931 | A1 | 1/2017 | Shu et al. | |

FOREIGN PATENT DOCUMENTS

| | | | |
|---|---|---|---|
| CN | 104930241 A | 9/2015 | |
| DE | 1 062 507 | 7/1959 | |
| JP | 2016-121790 A | 7/2016 | |
| KR | 10-2016-0012654 A | 2/2016 | |
| WO | WO-2005015066 A1 * | 2/2005 | ............... F16K 1/36 |

OTHER PUBLICATIONS

Office Action dated May 10, 2021 in corresponding European Patent Application No. 18 755 419.1, 8 pages.
European Office Action dated Mar. 18, 2022 in European Patent Application No. 18 755 419.1, 8 pages.

* cited by examiner

STEPPER DRIVEN VALVE FOR CONTROLLING FLUID COMMUNICATION BETWEEN A FUEL TANK AND A CANISTER

The invention relates to a valve for controlling a pressure differential by regulating the fluid flow between two chambers and to a pressure differential control method. Particularly, the invention relates to a stepper driven valve for controlling a pressure differential by regulating a fluid flow between a fuel tank and a canister in a vehicle. More generally, the invention relates to the field of conventional vehicles and hybrid vehicles.

It is known to use a stepper driven valve, also called an electro-valve, arranged between the fuel tank and an inlet of a canister for blocking the entrance of vapor in the canister. The difficulty is that since the vapor is under high pressure, sudden opening of the valve delivers a high quantity of vapor with a high flow rate, making it difficult to control the flow and leading to risks of further corking in the fuel system. To avoid this, it is also known in the prior art to use two combined valves in order to perform two specific functions on the fuel system, one providing a large venting path for the purpose of depressurizing the fuel tank with quick opening and high flow, and the other providing a smaller venting path capable of precisely controlling the flow through said orifice. The operation of this kind of fluid controlling system is illustrated in FIG. 1. This configuration requires controlling means for each of the valves, thus this kind of fuel system needs more space and is more expensive.

It is also know, for example from US 2002/0088957, to use an electrically operated-valve to control the pressure level in a fuel tank of a vehicle by controlling the fluid flow between the fuel tank and a canister. The valve described in this document is actuated by an electromagnetic solenoid, configured to move the valve element against the force of the resilient element. A solenoid actuated valve however does not allow a precise control of the pressure level in the fuel tank.

The object of the invention is to provide a stepper driven valve allowing a better flow control in the fuel system.

It is accordingly an object of the invention to provide a stepper driven valve for controlling a pressure differential by regulating the fluid flow between a fuel tank and a canister, said valve being configured for being actively positionable by a stepper motor in a closed position, an open position creating a fluid flow passageway with a first size, and one or more intermediate positions each creating a fluid flow passageway with a size which is smaller than said first size and comprising a moving element, movable relative to a valve opening between a closed position and an opened position, the moving element comprising:
  a sealing means for making a leak tight seal and,
  a deflecting means for controlling the fluid flow, said deflecting means being adapted to be located upstream relative to sealing means and protruding inside the valve opening to create said fluid flow passageways.

Thanks to the fact that the deflecting means protrudes inside the valve opening, the fluid flow rate is proportional to the axial movement of the elements when the fluid reaches the sealing means. Thus, the deflecting means restrict the fluid flow when they are moved from the open position to one of the intermediate positions. The restriction of the flow in turn allows to regulate the pressure differential between the fuel tank and the canister, and therefore to prevent a sudden increase of pressure which could lead to corking in the fuel system. In addition, the stepper driven valve is actuated by a stepper motor such that the stepper driven valve is actively positioned in one or more intermediate positions, preferably in more than two intermediate positions, more preferably more than five intermediate positions. By "actively positioning", it is to be understood that the position of the stepper driven valve is defined by a stepper motor. In other words, regardless the pressure differential between the fuel tank and the canister, the position of the stepper driven valve is imposed by the stepper motor. Thus, it differs from a valve which is passively positioned, in response to a biasing force provided by a spring in response to a fluid flow. It also differs from an electromagnetic solenoid, particularly in that a stepper motor allows precise positions, as well as several intermediate positions. A stepper motor is usually to be understood as an electric motor that divides a rotation into a number of equal steps to position the valve.

In a preferred embodiment, the deflecting means force the fluid flow to change direction when reaching the sealing means. Thanks to the deflecting means located upstream relative to the sealing means, the fluid under pressure is forced to change direction and flow in a restricted flow channel before reaching the sealing means. This change of direction and extension of length of channel provide a pressure drop of the fluid, and thus leads to a flow rate reduction, allowing a better control of the flow.

The herein disclosed valve provides both a pressure differential control and a flow control. The herein disclosed stepper valve is easy to manipulate. It is also cheaper to fabricate.

An advantage of a system using a stepper driven valve is that it requires less place than the prior art system.

In other words, the sealing means defines with the valve opening a first flow channel with a first flow direction, the deflecting means defines with the valve opening a second flow channel with a second flow direction, the second and the first directions defining an angle $\alpha$ which is more than $0°$ and less than $180°$, preferably more than $45°$ and less than $135°$, more preferably more than $90°$ and less than $120°$. Such values of the angle provide a reduction of flowrate which is particularly efficient.

In the present application, the direction of a flow has to be preferably understood as the main direction of said flow in a plane defined by a longitudinal cut of the stepper driven valve. A longitudinal cut of the stepper driven valve is a cut including a longitudinal axis, of the stepper driven valve. The longitudinal axis is usually the direction of movement of the moving element relative to the valve opening.

The stepper driven valve may further comprise one or more of the following features, taken alone or in combination:
  The sealing means are axial. They define together with the valve opening a first flow channel with a first flow direction, which is substantially perpendicular to the moving direction of the moving element. The moving element includes an outer truncated conical shape defining at least partially the deflecting means. The deflecting means define together with the valve opening a second flow channel having a second flow direction. The truncated conical shape is a very simple way to provide a restricted flow channel which forces the flow to change direction before reaching the axial direction of the sealing means. The axial sealing means provides good pressure resistance. As seen above, the second and the first directions of flow defines an angle which is preferably more than $45°$ and less than $135°$, more preferably more than $90°$ and less than $120°$.

From a longitudinal central axis towards a periphery of the moving element, the different means are radially arranged on the moving element as followed:
a. a central part of the moving element
b. the deflecting means for controlling the fluid flow
c. the sealing means for making a leak tight seal.

For example, the moving element has a central part which is substantially circular. The deflecting means and the sealing means are arranged at the periphery of the central part of the moving element, downstream of the central part. Thus, the deflecting means are located upstream of the sealing means, so that the pressurized fluid is forced to change direction and to flow in a restricted flow channel before reaching the sealing means.

The sealing means for making a leak tight seal and the deflecting means for controlling the fluid flow are made in one piece. Thus, the assembly of the moving element is easy and robust, and there no additional steps are required for positioning the deflecting means relative to the sealing means.

The sealing means for making a leak tight seal and the deflecting means for controlling the fluid flow are separate parts. It is thus possible to make different shapes of the deflecting element, particularly shapes which would be difficult to unmold if integrally molded.

The sealing means for making a leak tight seal and/or the deflecting means for controlling the fluid flow are made of elastomer, which makes the sealing very efficient.

The central axis (A) is a symmetry axis (A) of said moving element. This allows a homogeneous flow of the fluid all around the moving element.

It is also an object of the invention to provide a fuel system comprising a fuel tank, a filler pipe for adding liquid fuel, a carbon canister for collecting fuel vapors from the fuel tank during a refueling operation, a stepper motor and the stepper driven valve as described above.

It is also an object of the invention to provide a vehicle comprising a fuel system as described above.

It is furthermore an object of the invention to provide a method for controlling pressure differential by regulating the fluid flow between a fuel tank and a canister with a stepper driven valve of the invention, comprising the steps of receiving a command from an engine controller for a defined flow rate of fluid communication, converting said command into a defined position of the moving element relative to the valve opening and driving said stepper driven valve to said defined position.

The method may further comprise the following feature: said defined position is adjusted based on a feedback command from an engine controller, said feedback command being based on the air fuel ratio calculations in the engine.

The term "fuel tank" is understood to mean an impermeable tank that can store fuel under divers and varied environmental and usage condition. An example of this tank is that with which motor vehicle is equipped The term "corking" is understood to define what happens when the force of the rushing fuel vapor physically lifts the float of the valve against the seat, thereby blocking free vapor exit.

The term FTIV designate a Fuel Tank Isolation Valve. The function of this valve is to isolate the fuel tank from the carbon canister.

The following description shows some features of the stepper driven valve. This description is based on figures, in which.

Figure 3:
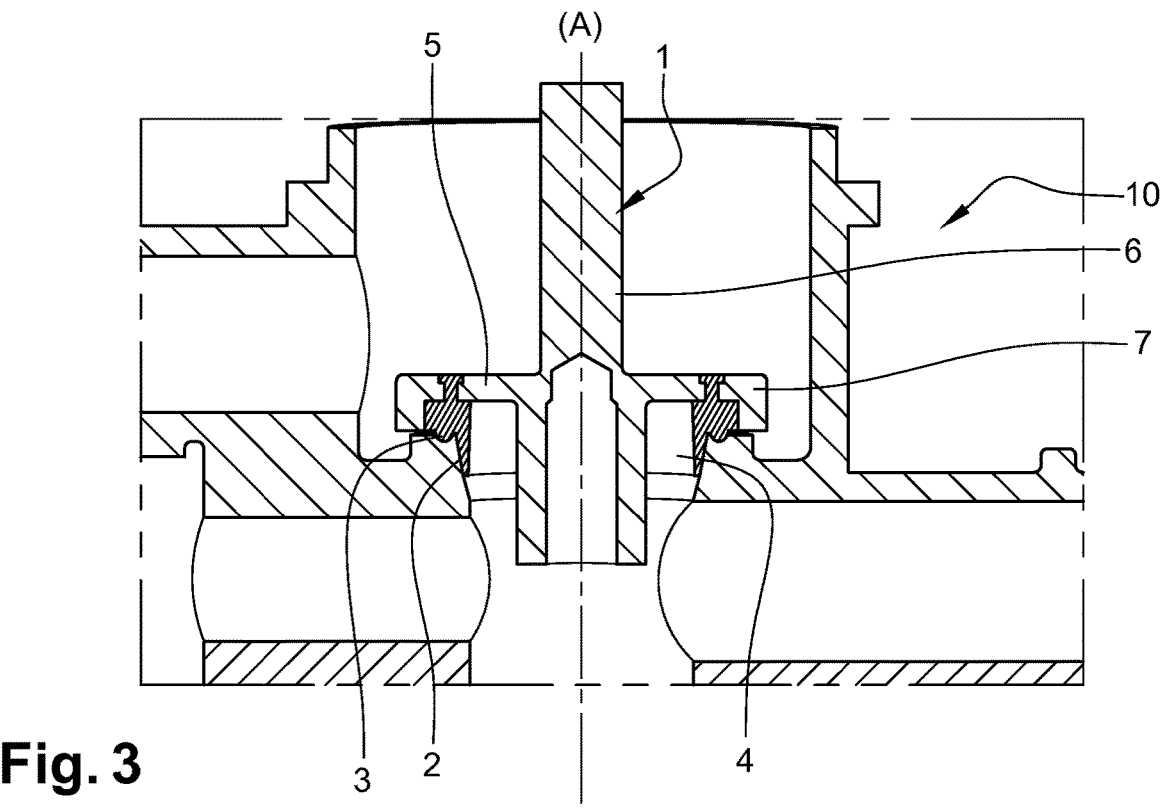
Figure 4:
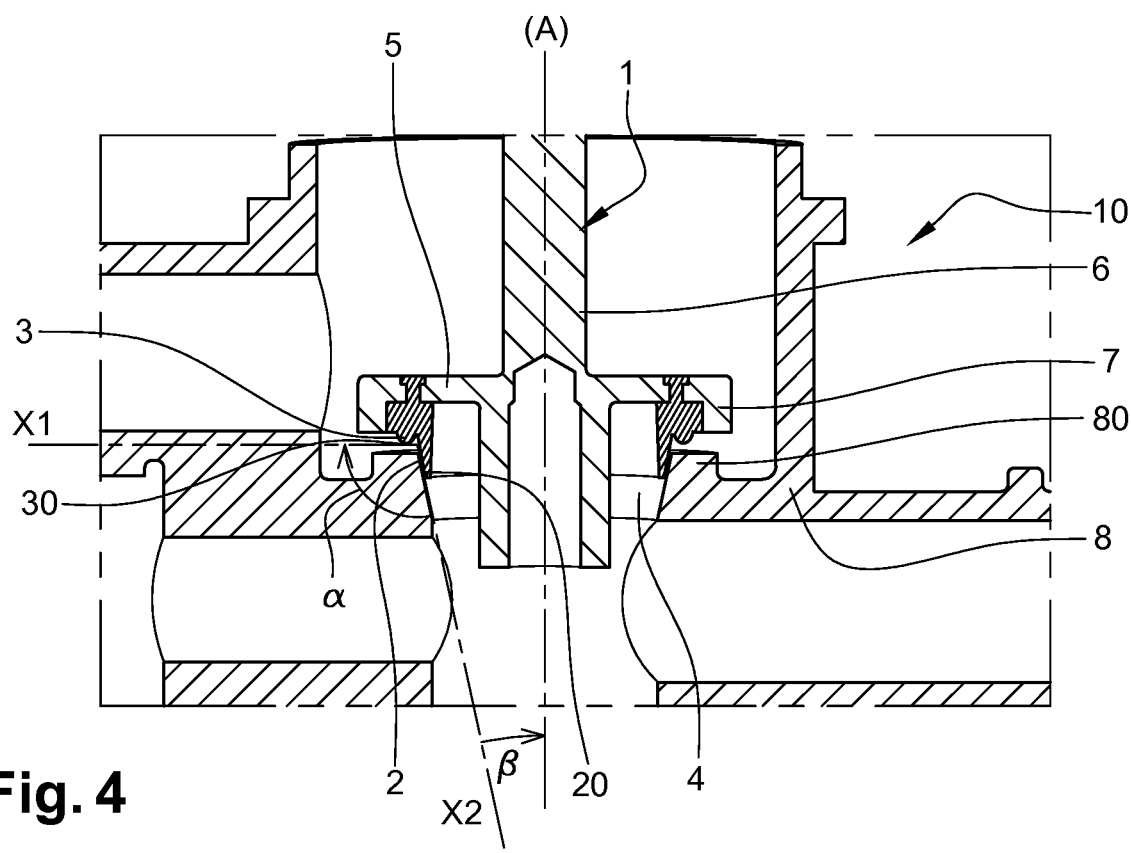
Figure 5:
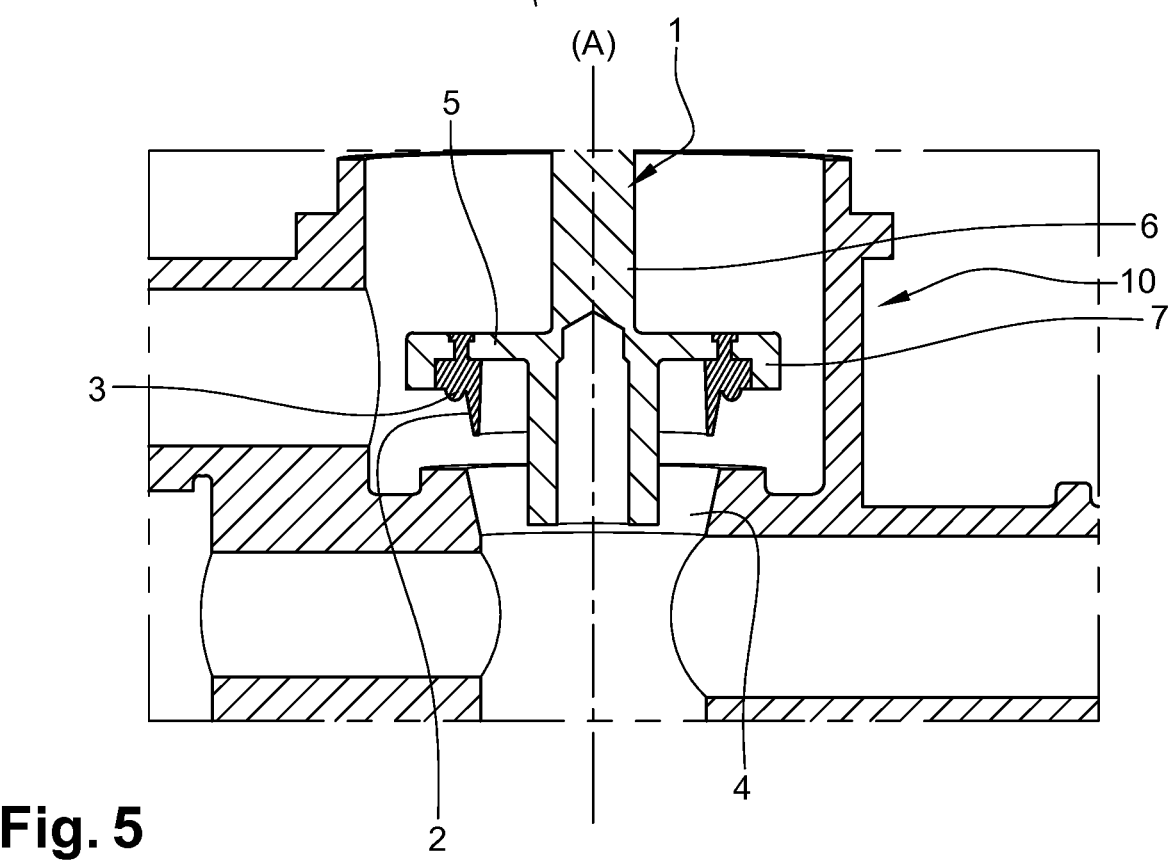

FIGS. 3, 4, and 5 are longitudinal cut-away views of the stepper driven valve in different positions.

Figure 6:
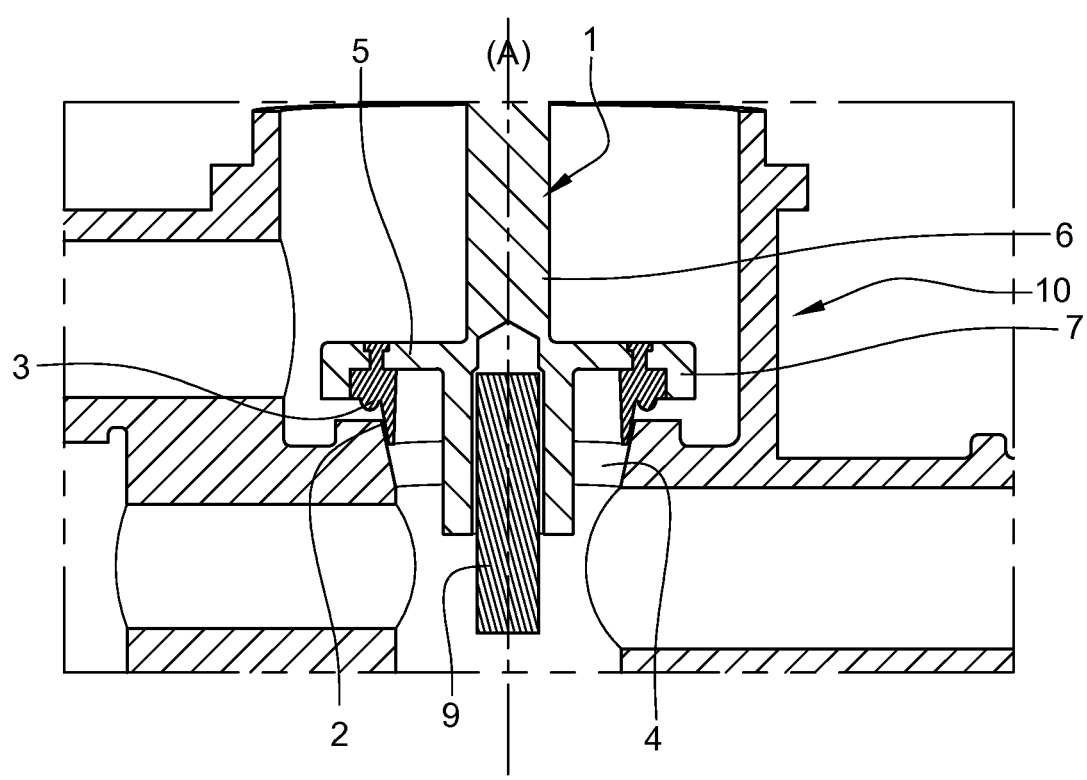

FIG. 6 is a longitudinal cut-away view of the stepper driven valve with the shaft of a stepper driven motor.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Figure 1:
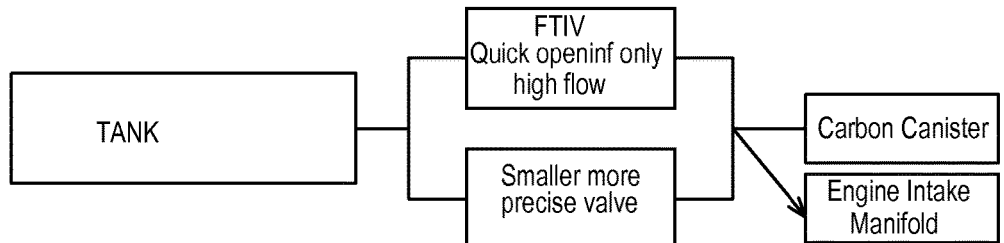
FIG. 1 is a schematic view illustrating a fluid controlling system according to the prior art.

FIG. 1 illustrates a fluid control system according to prior art. It comprises a fuel tank 100. The fuel tank is provided with a first valve 110 and a second valve 120. Both valves are connected to a carbon canister 130 and an engine intake manifold 140. The first valve 110 is adapted to provide a large venting path when there is a high flow of fuel. The second valve 120 is a smaller but more precise valve that is adapted to precisely control the flow of fuel from the engine intake manifold 140 to the tank 100. There is a vapor line that goes from the vapor rich side of the carbon canister to the intake manifold on the engine. It's more or less a tee fitting into the canister to tank line. This is why it can be helpful to isolate the tank from the canister during purge as the initial path of least resistance is to the fuel tank from the engine intake, and not necessarily through the canister. Isolating the tank before making the purge ensures that the whole flow is coming through the canister.

Figure 2:
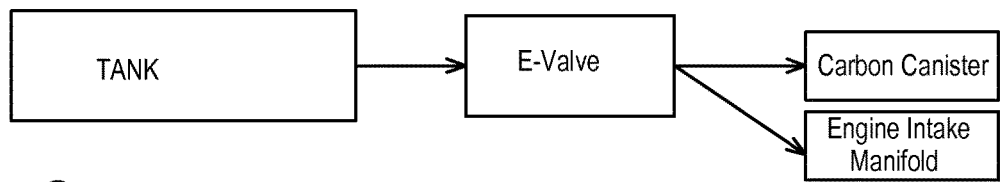
FIG. 2 is a schematic view illustrating a fluid controlling system using a stepper driven valve according to the invention.

FIG. 2 discloses a fluid controlling system using a stepper driven valve according to the invention. It comprises a fuel tank 200 provided with a stepper driven valve 10. The stepper driven valve 10 selectively controls pressure differential between the fuel tank 200 and a carbon canister 230 and an engine intake manifold 240. This selective control of pressure differential by the stepper driven valve 10 is effected by controlling fluid flow communication from the fuel tank 200 to the carbon canister 230 and engine intake manifold 240.

A stepper driven valve is designed by the reference 10 and is illustrated in FIGS. 3-6. The stepper driven valve 10 is arranged in a line between the vapor outlet of a vehicle fuel tank on one side and a canister inlet of a canister and an engine intake manifold on the other side. A schema of the arrangement is illustrated in FIG. 2 and described above. The whole fuel system further comprises an actuator for operation of the stepper driven valve and a controller for controlling the actuators.

The stepper driven valve 10 illustrated in FIGS. 3-6 comprises a moving element 1 and a valve opening 4, the movable element 1 being configured to be movable relative to the valve opening 4 between a closed position, an open position creating a passage-way with a first size, and one or more intermediate positions each creating a passageway with a size which is smaller than said first size.

The moving element 1 comprises a core part 6 with a substantially cylinder shape and a circular part 7 with a plate shape which is arranged upstream and orthogonal to the core part 6. The core part 6 has a longitudinal axis (A). The circular part 7 of the moving element 1 comprises a central part 5 which stays in contact with the vapor and is under pressure when the stepper driven valve 10 is at least on the closed position.

The moving element 1 further comprises sealing means 3 for making a leak tight seal and deflecting means 2 for controlling the fluid flow and thus the pressure differential between the fuel tank and the canister or engine intake manifold.

FIG. 3 illustrates the stepper driven valve 10 in the closed position wherein the valve is sealed by cooperation of the sealing means 3 with a counterpart 80 on the "fixed part" 8 of the stepper driven valve 10.

FIG. 4 illustrates the stepper driven valve 10 in one of the intermediate positions, wherein the deflecting means 2 provides an increased flow restriction coefficient for increased flow restriction resolution.

FIG. 5 illustrates the stepper driven valve 10 in the open position wherein the valve is open to a point where the flow restriction is minimal.

As can be seen on FIGS. 3-6, the deflecting means 2 are located upstream the sealing means. The fluid flow first passes in the valve opening 4 portion defined by the deflecting means 2, and then in valve opening portion defined by the sealing means 3. Thus, the deflecting means 2 guide the fluid flow to the sealing means 3, and the fluid flow is forced to change direction when reaching the sealing means 3.

From the longitudinal central axis (A) towards the periphery of the moving element 1, the different means are radially arranged on the moving element as follows:

a. the central part 5 of the moving element 1
b. the deflecting means 2 for controlling the fluid flow
c. the sealing means 3 for making a leak tight seal The sealing means 2 and the deflecting means 3 can be integrally made or they can be separated parts. At least one of them is made of elastomer, particularly the sealing means 3 to improve sealing. Preferably, both of them are made of elastomer for a better sealing and deflecting function.

Each of the deflecting means 2 and the sealing means 3 is a volume of a solid of revolution with specific cross sections as illustrated in FIGS. 3-6. The entire moving element 1 is also a volume of solid of revolution. The moving element 1 has an axis of symmetry which is the longitudinal axis (A) of the core part 6. The moving element 1 is movable along the longitudinal axis (A) between the different positions.

The sealing means 3 are axial, which means that they are movable along the longitudinal axis (A) to fulfill the sealing effect. As can be seen on FIG. 4, they define with the valve opening 4 a first flow channel 30 with a first flow direction X1 which is substantially perpendicular to the moving direction A of the moving element 1. To improve tightness, the sealing means 3 include a rib protruding upstream from the central part 5. This rib has a section which is substantially semi-circular. In other words, the sealing means include a rib which is a "half O-ring". The first flow channel 30 in valve opening 4 is arranged in a plane which is substantially orthogonal to the longitudinal axis (A).

The deflecting means 2 is at least partially defined by an outer truncated conical shape included in the moving element 1. In other words, at least one longitudinal cross-section of the deflecting means 2 has substantially the shape of a truncated cone. The deflecting means 2 protrude inside the valve opening 4 and define with the valve opening 4 a second flow channel 20 with a second flow direction X2.

The second and the first flow directions define an angle α (alpha) which is more than 0° and less than 180°. Preferably, the angle α which is more than 45° and less than 135°, more preferably more than 90° and less than 120°, for example around 100°. In this preferred embodiment, the angle β (beta) between the second direction X2 and the longitudinal axis A is between 0 and 30°, for example around 10°.

FIG. 6 illustrates the stepper drive valve 10 in one of the intermediate positions, with a shaft 9 of the stepper motor located in an hollow portion of the core part 6 of the moving element 1. The shaft 9 is axially and radially connected to the moving element 1, which is also known as "poppet", so as to precisely control the position of said moving element 1, or poppet, regardless of the pressure differential between the fuel tank side and the canister side. Thus, the stepper motor allows that the stepper drive valve 10 precisely controls the pressure differential between the fuel tank and the canister. This is particularly efficient to prevent sudden increase of the pressure, thus avoiding risks of further corking in the whole fuel system.

The invention is not limited to the illustrated embodiment, especially the deflecting means 2 can have any other shapes, such as a stair-step shape, which should allow the deflecting means 2 to be adapted to be located upstream relative to sealing means 3 and to force the fluid flow to change direction when reaching the sealing means 3.

The stepper driven valve 10 can be controlled by an engine controller according to a method comprising the steps of receiving a command from the engine controller for a defined pressure differential defining a flow rate of fluid communication between the fuel tank and the canister, converting said command into a defined position of the moving element 1 relative to the valve opening 4 and driving said stepper driven valve 10 to said defined position.

In an embodiment, said defined position is adjusted based on a feedback command from said engine controller, said feedback command being based on the air fuel ratio calculations in the engine. To this end, the controller is located on the vehicle.

The controller is a simple control system. Basically, the engine is running normally and adjusts the fuel injector output based on inputs from the driver and the exhaust. When purge occurs, the purge valve is used in the same way as a fuel injector and responds to these same inputs. There is generally more input from exhaust since purge usually only occurs in steady state engine conditions. The purge input is not as precise as a fuel injector since it is not precisely known how much fuel vapor is present in the air flowing into the system.

The engine controller estimates the amount of fuel vapor coming in from the fuel tank during a purge and then the stepper driven valve 10 is opened or closed depending on this amount. Said estimation of the amount of vapor is based on inference of the effect of the incoming purge flow on the air-fuel ratio assuming the fuel injector flow is under control.

The calculations of the air-fuel ratio can be made by feedback from an oxygen sensor on the exhaust manifold.

Based on the oxygen content of the exhaust gas, the system can determine how close to a stoichiometric ratio the combustion process is at.

The stepper driven valve 10 can be used in a fuel system comprising a fuel tank 200, a filler pipe for adding liquid fuel, a carbon canister 230 for collecting fuel vapors from the fuel tank 200 during a refueling operation. The stepper driven valve 10 can also be used in a vehicle comprising such a fuel system.

The invention claimed is:

1. A fuel system comprising:
   a fuel tank,
   a filler pipe for adding liquid fuel,
   a carbon canister for collecting fuel vapors from the fuel tank during a refueling operation,
   a stepper motor, and
   a stepper driven valve for controlling a pressure differential by regulating the fluid flow between the fuel tank and the canister, said valve being configured for being actively positionable by the stepper motor in a closed position, an open position creating a fluid flow passageway with a first size, and one or more intermediate positions each creating a fluid flow passageway with a size which is smaller than said first size and comprising a moving element, movable relative to a valve opening between a closed position and an opened position, the moving element comprising:
      a core part with a substantially cylinder shape, the core part including a hollow portion which is open at an end thereof in a valve upstream direction,
      a circular part with a plate shape which is arranged upstream and orthogonal to the core part, the circular part including a central part,
      sealing means for making a leak tight seal, and
      deflecting means for controlling the fluid flow, said deflecting means being adapted to be located upstream relative to sealing means and protruding inside the valve opening to create said fluid flow passageways,
   wherein the valve opening has a truncated conical shape,
   wherein the sealing means and deflecting means are made in a unitary single piece and are formed of a material comprising an elastomer, and
   wherein in one of the intermediate positions, a shaft of the stepper motor is located in the hollow portion of the core part.

2. The fuel system according to claim 1, wherein the deflecting means force the fluid flow to change direction when reaching the sealing means.

3. The fuel system according to claim 2, wherein
   the sealing means are axial, and define with the valve opening a first flow channel with a first flow direction which is substantially perpendicular to the moving direction of the moving element,
   the moving element includes an outer truncated conical shape defining at least partially the deflecting means, the deflecting means defining with the valve opening a second flow channel with a second flow direction.

4. The fuel system according to claim 3, wherein said second and first directions define an angle which is more than 90° and less than 120°.

5. The fuel system according to claim 1, wherein from a longitudinal central axis towards a periphery of the moving element, the different means are radially arranged on the moving element as follows:
   the central part of the moving element,
   the deflecting means for controlling the fluid flow,
   the sealing means for making a leak tight seal when the valve is in the closed position.

6. The fuel system according to claim 5, wherein the central axis is a symmetry axis of said moving element.

7. A vehicle comprising a fuel system according to claim 1.

8. A method for controlling in a fuel system according to claim 1, a pressure differential by regulating a fluid flow between the fuel tank and the canister with the stepper driven valve, comprising:
   receiving a command from an engine controller for a defined flow rate of fluid communication,
   converting said command into a defined position of the moving element relative to the valve opening, and
   driving said stepper driven valve to said defined position.

9. The method according to claim 8, wherein said defined position is adjusted based on a feedback command from said engine controller, said feedback command being based on air fuel ratio calculations in the engine.

10. The fuel system according to claim 1, wherein the sealing means include a rib protruding upstream from the central part and having a substantially semi-circular section.

\* \* \* \* \*